(12) United States Patent
Ryu et al.

(10) Patent No.: US 11,462,750 B2
(45) Date of Patent: Oct. 4, 2022

(54) FUEL CELL VEHICLE HAVING SMALL SPACE OCCUPIED BY HUMIDIFIER AND COOLER

(71) Applicants: HYUNDAI MOTOR COMPANY, Seoul (KR); KIA CORPORATION, Seoul (KR)

(72) Inventors: Tae Woo Ryu, Pohang-si (KR); Seung Jun Yeon, Yongin-si (KR); Jung Do Suh, Seoul (KR); Woo Young Lee, Yongin-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/410,311

(22) Filed: Aug. 24, 2021

(65) Prior Publication Data

US 2022/0209260 A1 Jun. 30, 2022

(30) Foreign Application Priority Data

Dec. 29, 2020 (KR) .................... 10-2020-0185989

(51) Int. Cl.
*H01M 8/04014* (2016.01)
*H01M 8/04119* (2016.01)

(52) U.S. Cl.
CPC ... *H01M 8/04014* (2013.01); *H01M 8/04134* (2013.01); *H01M 2250/20* (2013.01)

(58) Field of Classification Search
CPC ......... H01M 8/04014; H01M 8/04134; H01M 2250/20
See application file for complete search history.

(56) References Cited

U.S. PATENT DOCUMENTS

| 2017/0043655 A1* | 2/2017 | Aishima | ........... H01M 8/04955 |
| 2019/0013530 A1* | 1/2019 | Becker | .............. H01M 8/04126 |

FOREIGN PATENT DOCUMENTS

KR    10-2012-0016908 A    2/2012

* cited by examiner

*Primary Examiner* — Stewart A Fraser
(74) *Attorney, Agent, or Firm* — Morgan, Lewis & Bockius LLP

(57) ABSTRACT

A fuel cell vehicle includes a fuel cell, an air compressor configured to draw in and discharge air, a cooler configured to cool air discharged from the air compressor, a humidifier configured to humidify air cooled by the cooler and to supply the humidified air to the fuel cell, and a system frame on which the fuel cell is disposed. The system frame accommodates at least a portion of each of the cooler and the humidifier therein.

18 Claims, 21 Drawing Sheets

FUEL CELL VEHICLE HAVING SMALL SPACE OCCUPIED BY HUMIDIFIER AND COOLER

CROSS-REFERENCE TO RELATED APPLICATION

This application claims the benefit of priority to Korean Patent Application No. 10-2020-0185989, filed on Dec. 29, 2020 in the Korean Intellectual Property Office, which is hereby incorporated by reference as if fully set forth herein.

TECHNICAL FIELD

The present disclosure relates to a fuel cell vehicle capable of reducing a space for accommodating a humidifier and a cooler.

BACKGROUND

A vehicle equipped with a fuel cell (hereinafter referred to as a "fuel cell vehicle") is provided with a cooler to cool high-temperature air discharged from an air compressor. The cooled air is humidified by a humidifier, and is supplied to a cell stack of the fuel cell. However, the cooler and the humidifier occupy a large space in the fuel cell vehicle, which causes many constraints in installation thereof. Therefore, research for solving this problem is underway.

The matters described in this background are written to enhance an understanding of the background of the disclosure, and may include matters other than the prior art already known to those of ordinary skill in the field to which this technology belongs

SUMMARY

Exemplary embodiments are directed to a fuel cell vehicle that substantially obviates one or more problems due to limitations and disadvantages of the related art.

Embodiments provide a fuel cell vehicle in which the space occupied by a humidifier and a cooler is relatively small.

However, the objects to be accomplished by the embodiments are not limited to the above-mentioned objects, and other objects not mentioned herein will be clearly understood by those skilled in the art from the following description.

A fuel cell vehicle according to an embodiment may include a fuel cell, an air compressor configured to draw in and discharge air, a cooler configured to cool air discharged from the air compressor, a humidifier configured to humidify air cooled by the cooler and to supply humidified air to the fuel cell, and a system frame on which the fuel cell is disposed, the system frame accommodating at least a portion of each of the cooler and the humidifier therein.

The air compressor may be disposed on the system frame.

The system frame may include an upper plate, a lower plate disposed under the upper plate, and a plurality of side plates disposed between the upper plate and the lower plate to form an internal space to accommodate the cooler and the humidifier therein. The air compressor may be disposed on the upper plate.

The internal space may include a first space in which the cooler is disposed, a second space in which the humidifier is disposed, the second space being adjacent to the first space in a first direction, in which the fuel cell vehicle travels, and a third space communicating with the first space to form a flow path through which air discharged from the air compressor travels to the cooler.

The upper plate may include a first air inlet into which air discharged from the air compressor is introduced, the first air inlet communicating with the third space, a first air outlet through which air discharged from the humidifier is discharged to the fuel cell, a second air inlet into which air and condensate water discharged from the fuel cell are introduced, the air being a reactant gas, and a condensate water inlet into which hydrogen and condensate water discharged from the fuel cell are introduced, the hydrogen being a reactant gas.

The cooler may include a first cooling medium inlet into which a cooling medium is introduced to cool air introduced from the third space and a first cooling medium outlet through which the cooling medium, having cooled the air, is discharged.

The plurality of side plates may include a second cooling medium inlet into which the cooling medium is introduced from the outside, the second cooling medium inlet communicating with the first cooling medium inlet, a second cooling medium outlet through which the cooling medium discharged from the first cooling medium outlet is discharged to the outside, and a second air outlet communicating with the second space to discharge air discharged from the humidifier to the outside therethrough, the air being a reactant gas.

The fuel cell vehicle may further include an air pressure control unit disposed in the second air outlet.

The internal space may further include a fourth space located between the first space and the second space to form a flow path through which air discharged from the cooler travels to the humidifier.

The internal space may further include a fifth space forming a flow path through which air discharged from the humidifier travels to the first air outlet.

The humidifier may include a plurality of hollow fiber membranes, arranged so as to be spaced apart from each other, and partition walls, disposed between the plurality of hollow fiber membranes to form shell sides communicating with the second air inlet and the condensate water inlet.

The air compressor may be directly connected to the first air inlet.

The fuel cell vehicle may further include an air cutoff valve configured to receive the air discharged from the humidifier and to discharge the condensate water and air as the reactant gas.

The air cutoff valve may be directly connected to the first air outlet and the second air inlet.

The fuel cell vehicle may further include a driving motor, disposed under the system frame, and an inverter, connected to the driving motor and disposed under the system frame.

The inverter may be disposed adjacent to the driving motor in the direction in which the fuel cell vehicle travels.

The inverter may be disposed between the driving motor and the system frame.

The fuel cell may include a cell stack configured to generate power using hydrogen and air, the cell stack including a plurality of unit cells stacked on one another, and the plurality of unit cells may be stacked in a direction parallel to the direction in which the fuel cell vehicle travels.

BRIEF DESCRIPTION OF THE DRAWINGS

Arrangements and embodiments may be described in detail with reference to the following drawings, in which like reference numerals refer to like elements.

DETAILED DESCRIPTION OF THE INVENTION

The present disclosure will now be described more fully hereinafter with reference to the accompanying drawings, in which various embodiments are shown. The examples, however, may be embodied in many different forms, and should not be construed as being limited to the embodiments set forth herein. Rather, these embodiments are provided so that this disclosure will be more thorough and complete, and will more fully convey the scope of the disclosure to those skilled in the art.

It will be understood that when an element is referred to as being "on" or "under" another element, it may be directly on/under the element, or one or more intervening elements may also be present.

When an element is referred to as being "on" or "under", "under the element" as well as "on the element" may be included based on the element.

In addition, relational terms, such as "first", "second", "on/upper part/above" and "under/lower part/below", are used only to distinguish between one subject or element and another subject or element, without necessarily requiring or involving any physical or logical relationship or sequence between the subjects or elements.

Hereinafter, a fuel cell vehicle 100 (100A) according to an embodiment will be described with reference to the accompanying drawings. The fuel cell vehicle 100 (100A) will be described using the Cartesian coordinate system (x-axis, y-axis, z-axis) for convenience of description, but may also be described using other coordinate systems. In the Cartesian coordinate system, the x-axis, the y-axis, and the z-axis are perpendicular to each other, but the embodiment is not limited thereto. That is, the x-axis, the y-axis, and the z-axis may intersect each other obliquely. For convenience of description, the +x-axis direction or the −x-axis direction will be referred to as a "first direction", the +y-axis direction or the −y-axis direction will be referred to as a "second direction", and the +z-axis direction or the −z-axis direction will be referred to as a "third direction".

Figure 1:
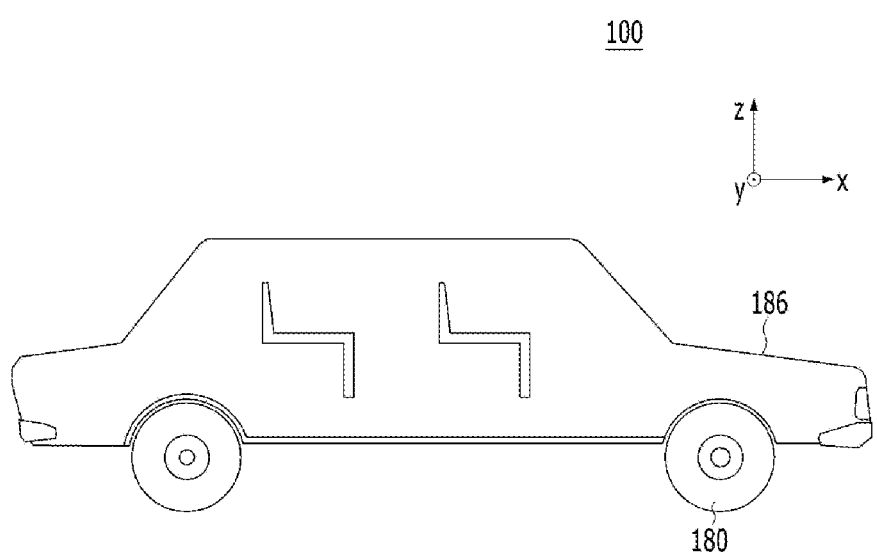
FIG. 1 is a cross-sectional view showing an external appearance of a fuel cell vehicle according to an embodiment of the present disclosure.

FIG. 1 is a cross-sectional view showing the external appearance of a fuel cell vehicle according to an embodiment.

A fuel cell vehicle 100 shown in FIG. 1 may move in the first direction, and may include front wheels 180 and a hood 186, which will be described later.

Figure 2A:
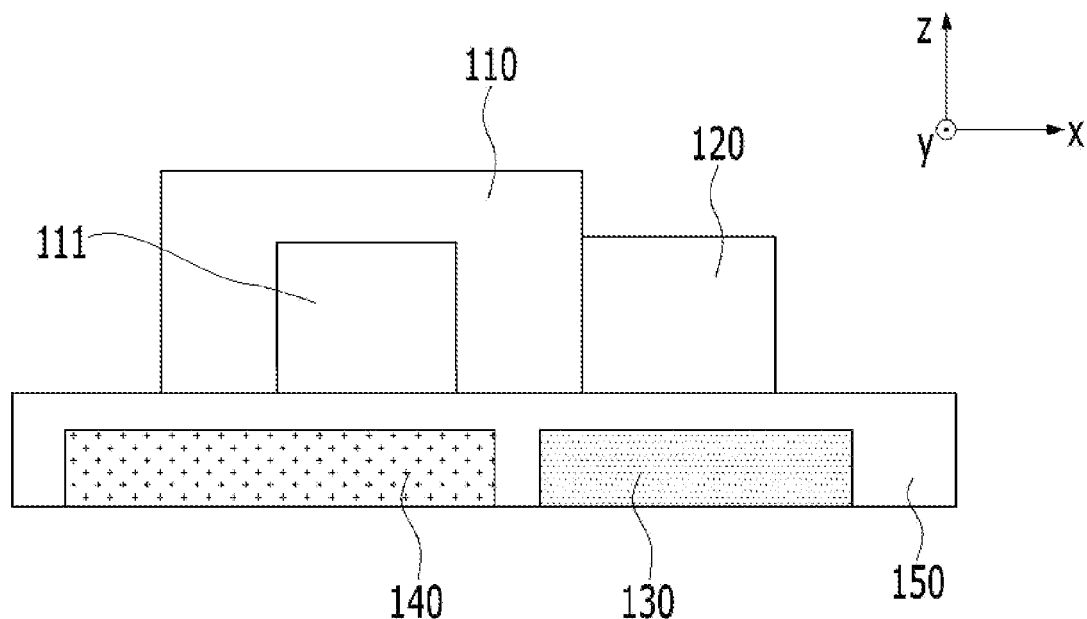
FIGS. 2A and 2B are, respectively, a side-sectional view and a rear view of the fuel cell vehicle shown in FIG. 1.
Figure 2B:
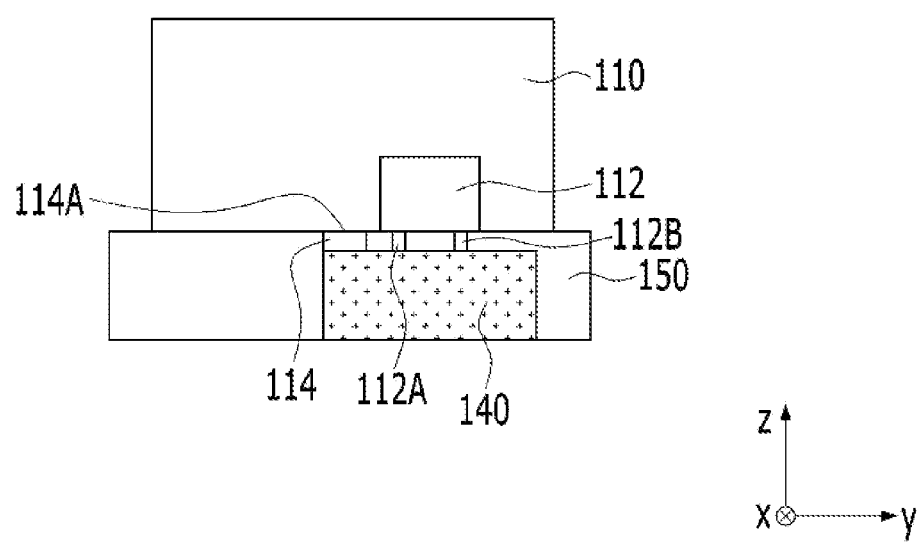

FIG. 2A is a side-sectional view of the fuel cell vehicle 100 shown in FIG. 1, and FIG. 2B is a rear view of the fuel cell vehicle 100 shown in FIG. 1.

The fuel cell vehicle 100 shown in FIGS. 2A and 2B may include a fuel cell 110, an air compressor 120, a cooler (or an intercooler or an air cooler) 130, a humidifier 140, and a system frame (or a system-mounting frame) 150.

The fuel cell 110 may be mounted on the system frame 150 and supported thereby.

The fuel cell 110 of the fuel cell vehicle 100 according to an embodiment of the present disclosure may be at least one unit fuel cell.

The fuel cell 110 according to an embodiment of the present disclosure may be a single unit fuel cell, which is not stacked in any one of the first to third directions.

The fuel cell 110 according to another embodiment of the present disclosure may include a plurality of unit fuel cells, which are stacked in at least one of the first, second, or third direction.

The unit fuel cell may be a polymer electrolyte membrane fuel cell (or a proton exchange membrane fuel cell) (PEMFC), which has been studied most extensively as a power source for driving vehicles. However, the embodiment is not limited to any specific configuration or external appearance of the unit fuel cell.

The unit fuel cell may include end plates (or pressing plates or compression plates) (not shown), current collectors (not shown), and a cell stack 111.

The cell stack 111 may include a plurality of unit cells, which are stacked in the first or second direction. Several tens to several hundreds of unit cells, e.g. 100 to 400 unit cells, may be stacked to form the cell stack 111.

Each unit cell may generate 0.6 volts to 1.0 volts of electricity. Thus, the number of unit fuel cells included in the fuel cell 110 and the number of unit cells included in the cell stack 111 of the unit fuel cell may be determined in accordance with the intensity of the power to be supplied from the fuel cell 110 to a load. Here, "load" may refer to a part of the fuel cell vehicle 100 that requires power.

The first and second end plates may be disposed at respective ends of the cell stack 111, and may support and fix the plurality of unit cells. That is, the first end plate may be disposed at one of the two ends of the cell stack 111, and the second end plate may be disposed at the other one of the two ends of the cell stack 111.

Although not shown in FIGS. 2A and 2B, the fuel cell vehicle 100 may further include an air filter. The air filter may filter air present around the fuel cell vehicle (e.g. air in the atmosphere), and may provide the filtered air to the air compressor 120. For example, the air suctioned into the air filter may contain foreign substances and fine dust. The air filter may filter the air to remove foreign substances and fine dust from the air, and may provide the filtered air to the air compressor 120.

The air compressor 120 may suction dry air filtered by the air filter, and may blow the air to the humidifier 140. According to the embodiment, the air compressor 120 may be disposed on the system frame 150, but the embodiment is not limited to any specific position of the air compressor 120.

The cooler 130 serves to cool the high-temperature and dry air blown from the air compressor 120.

The humidifier 140 may humidify the air cooled by the cooler 130, and may supply the humidified air to the fuel cell 110. The humidifier 140 may include a plurality of cartridges (or hollow fiber membrane bundles), which may contain moisture.

Examples of the cooler 130 and the humidifier 140 will be described later in detail with reference to FIGS. 5A, 5B, 6A and 6B.

According to the embodiment, the system frame 150 may accommodate at least a portion of each of the cooler 130 and the humidifier 140 therein. For example, as shown in FIGS. 2A and 2B, the entirety of each of the cooler 130 and the humidifier 140 may be disposed inside the system frame 150, but the embodiment is not limited thereto. That is, according to another embodiment, unlike what is shown in FIGS. 2A and 2B, a portion of at least one of the cooler 130 or the humidifier 140 may be disposed inside the system frame 150, and the remaining portion thereof may protrude upwards or downwards from the system frame 150 so as to be disposed outside the system frame 150.

Hereinafter, the cooler 130 and the humidifier 140 will be described as being completely disposed inside the system frame 150. However, the following description may also apply to a structure in which a portion of at least one of the cooler 130 or the humidifier 140 is disposed inside the system frame 150 and the remaining portion thereof protrudes upwards or downwards from the system frame 150 so as to be disposed outside the system frame 150.

Although it is shown in FIGS. 2A and 2B that the cooler 130 is disposed closer to the front side of the vehicle 100 than the humidifier 140, the embodiment is not limited thereto. That is, according to another embodiment, unlike what is shown in FIGS. 2A and 2B, the humidifier 140 may be disposed closer to the front side of the vehicle 100 than the cooler 130.

Figure 3A:
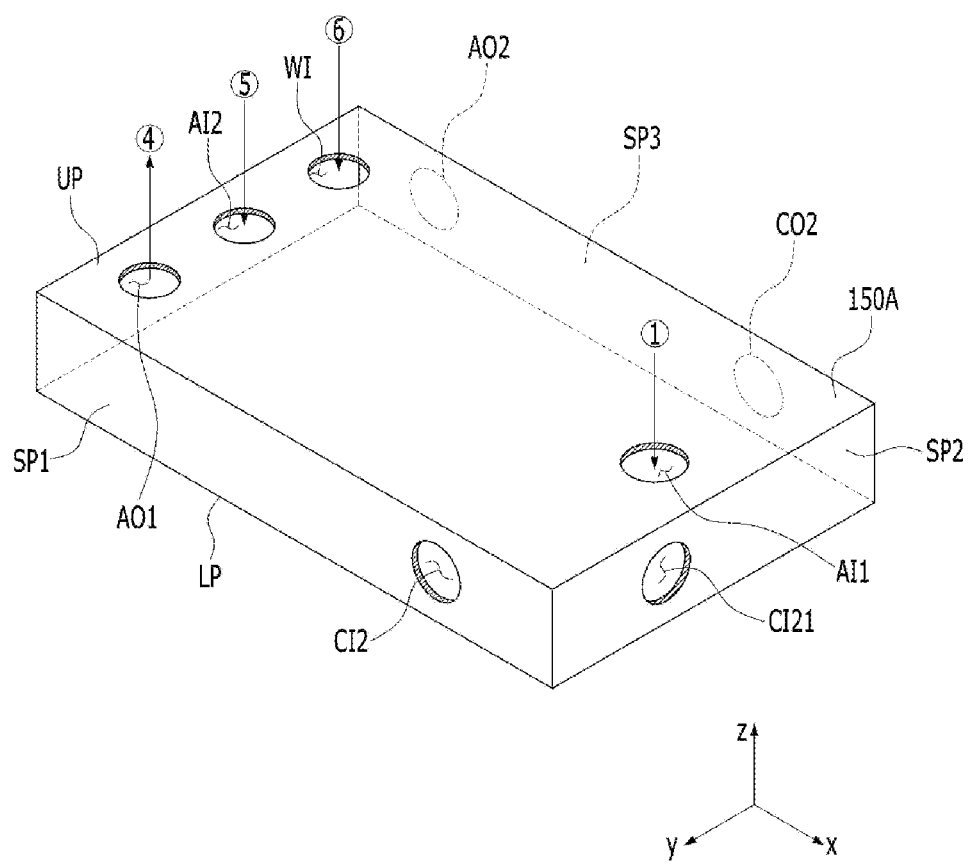
FIGS. 3A and 3B are, respectively, a perspective view and a plan view showing the external appearance of an embodiment of the system frame shown in FIGS. 2A and 2B.
Figure 3B:
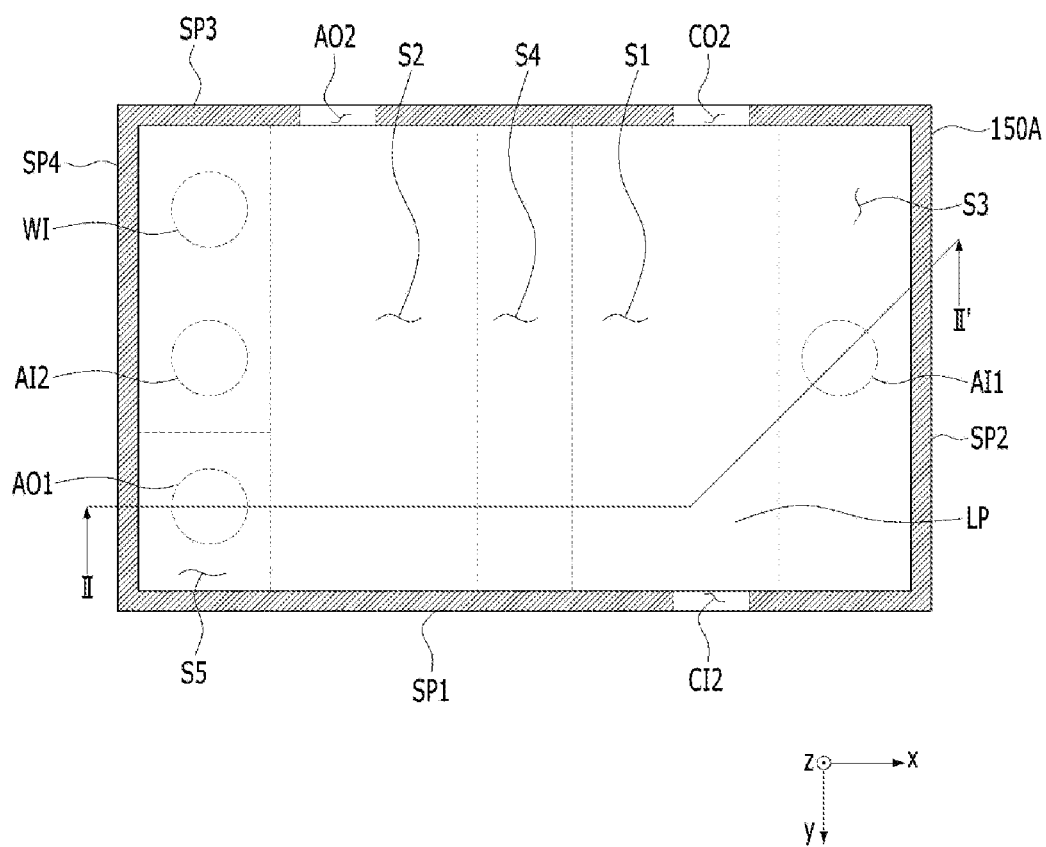

FIGS. 3A and 3B are, respectively, a perspective view and a plan view showing the external appearance of an embodiment 150A of the system frame 150 shown in FIGS. 2A and 2B. FIG. 3B shows the system frame 150A shown in FIG. 3A, from which an upper plate UP is excluded. However, for better understanding, multiple inlets and outlets formed in the upper plate UP are indicated by dotted lines in FIG. 3B.

According to the embodiment, the system frame 150A may include an upper plate UP, a lower plate LP, and a plurality of side plates SP1, SP2, SP3 and SP4. Referring to FIGS. 3A and 3B, each of the upper plate UP, the lower plate LP, and the side plates SP1, SP2, SP3 and SP4 is depicted as having a rectangular shape, but the embodiment is not limited to any specific shape of each of the upper plate UP, the lower plate LP, and the side plates SP1, SP2, SP3 and SP4.

The upper plate UP is provided with multiple inlets and outlets, which will be described later. The air compressor 120 shown in FIGS. 2A and 2B may be disposed on the upper plate UP of the system frame 150A, but the embodiment is not limited to any specific position of the air compressor 120, as described above.

The lower plate LP may be disposed below the upper plate UP, and the side plates SP1 to SP4 may be disposed between the upper plate UP and the lower plate LP to define an internal space for accommodating the cooler 130 and the humidifier 140 together with the lower plate LP and the upper plate UP.

The internal space in the system frame 150A may include a first space S1, a second space S2, and a third space S3. The first space S1 is a space in which the cooler 130 is disposed, and the second space S2 is a space in which the humidifier 140 is disposed. The second space S2 may be adjacent to the first space S1 in the first direction, in which the fuel cell vehicle 100 travels.

The third space S3 may communicate with the first space S1, and may form a flow path through which the air discharged from the air compressor 120 travels to the cooler 130.

According to an embodiment, the internal space in the system frame 150A may further include a fourth space S4. The fourth space S4 may be located between the first space S1 and the second space S2, and may form a flow path through which the air discharged from the cooler 130 travels to the humidifier 140.

According to another embodiment, the fourth space S4 may be omitted. In this case, unlike what is shown in FIG. 3B, the first space S1 and the second space S2 may be contiguous with each other. That is, the outlet of the cooler 130 may be directly connected to the inlet of the humidifier 140.

The upper plate UP may include a first air inlet AI1, a first air outlet AO1, a second air inlet AI2, and a condensate water inlet WI.

The first air inlet AI1 is an inlet into which air discharged from the air compressor 120 is introduced. The first air inlet AI1 may communicate with the third space S3. The air compressor 120 may be directly connected to the first air inlet AI1.

The first air outlet AO1 is an outlet through which air discharged from the humidifier 140 is discharged to the cell stack 111 of the fuel cell 110. The internal space in the system frame 150A may further include a fifth space S5.

The fifth space S5 may form a flow path through which air discharged from the humidifier 140 travels to the first air outlet AO1. The process in which the humidified air discharged from the humidifier 140 is discharged through the first air outlet AO1 via the fifth space S5 will be described later in detail with reference to FIG. 7.

The second air inlet AI2 is an inlet into which air, which is a reactant gas, and condensate water (hereinafter referred to as "first condensate water"), which are discharged from the cell stack 111 of the fuel cell 110, are introduced.

The condensate water inlet WI is an inlet into which hydrogen, which is a reactant gas, and condensate water (hereinafter referred to as "second condensate water"), which are discharged from the cell stack 111, are introduced. The second condensate water may be discharged to the humidifier 140 through the condensate water pipe 114 shown in FIG. 2B. For example, the condensate water pipe 114 may be directly connected to the condensate water inlet WI.

The fuel cell vehicle according to the embodiment may further include an air cutoff valve 112, as shown in FIG. 2B.

The air cutoff valve 112 may include an inlet portion 112A and an outlet portion 112B. Here, the inlet portion 112A is a portion through which air flows into the fuel cell 110 from the outside of the fuel cell 110, and the outlet portion 112B is a portion through which air flows out from the inside of the fuel cell 100 to the outside. The air cutoff valve 112 may open or close the inlet portion 112A and the outlet portion 112B at the same time. For example, the inlet portion 112A and the outlet portion 112B of the air cutoff valve 112 may be simultaneously opened or closed by the operation of a motor (not shown), but the embodiment is not limited thereto. That is, the air cutoff valve 112 may open or close the inlet portion 112A and the outlet portion 112B simultaneously in various ways. To this end, the fuel cell 110 may further include a controller (not shown). When the vehicle 100 equipped with the fuel cell 110 is turned off or is not driven for a long time, the controller may generate a control signal for driving the motor so that the inlet portion 112A and the outlet portion 112B are simultaneously closed. Alternatively, when the vehicle 100 equipped with the fuel cell 110 is turned on, the controller may generate a control signal for driving the motor so that the inlet portion 112A and the outlet portion 112B are simultaneously opened.

According to the embodiment, air discharged from the humidifier 140 may be introduced into the air cutoff valve 112 through the inlet portion 112A. To this end, the inlet portion 112A of the air cutoff valve 112 may be directly connected to the first air outlet AO1. Further, the air cutoff valve 112 may discharge air, which is a reactant gas, and the first condensate water to the humidifier 140 through the outlet portion 112B. To this end, the outlet portion 112B of the air cutoff valve 112 may be directly connected to the second air inlet AI2.

Figure 4:
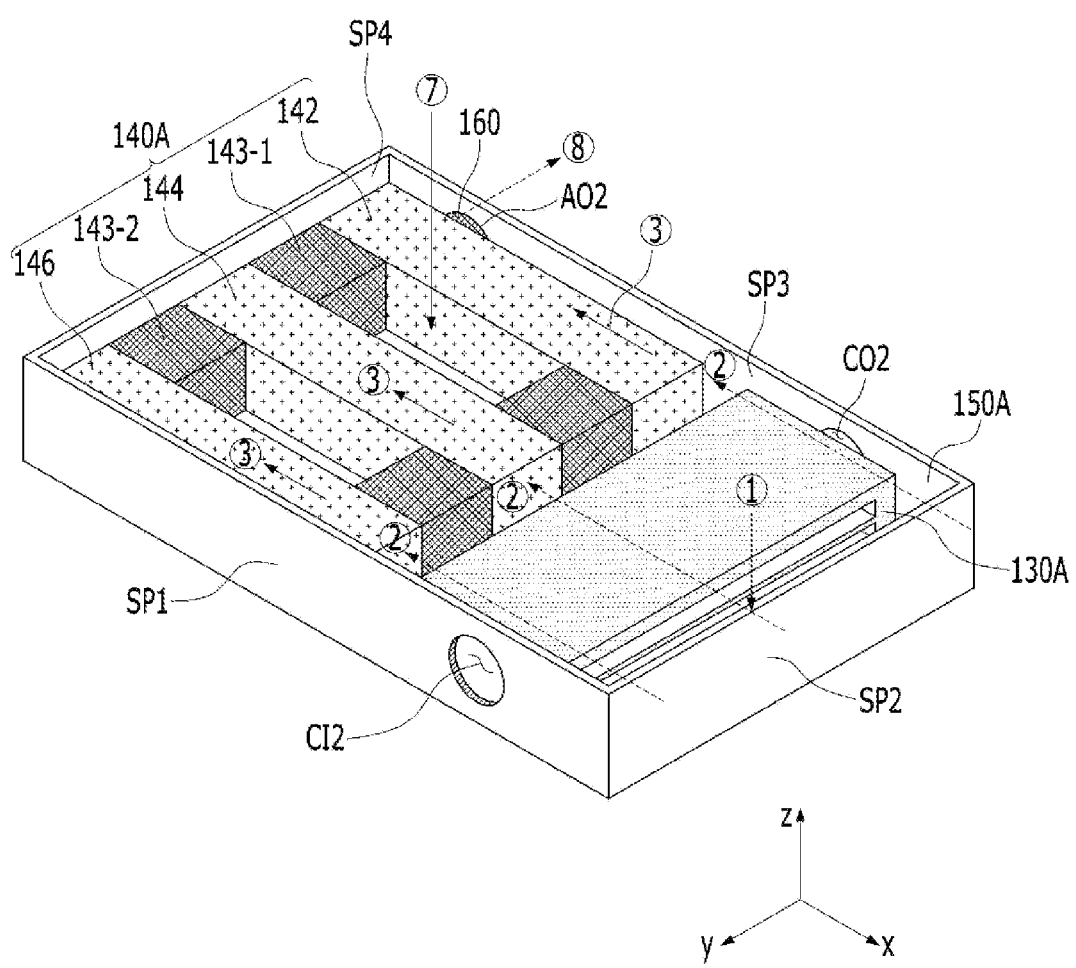
FIG. 4 is a perspective view of the system frame shown in FIG. 3A, from which an upper plate is excluded.

FIG. 4 is a perspective view of the system frame 150A shown in FIG. 3A, from which the upper plate UP is excluded.

Referring to FIG. 4, a cooler 130A is disposed in the first space S1 in the system frame 150A, and corresponds to an embodiment of the cooler 130 shown in FIG. 2A. A humidifier 140A is disposed in the second space S2 in the system frame 150A, and corresponds to an embodiment of the humidifier 140 shown in FIGS. 2A and 2B.

The fuel cell vehicle according to the embodiment is not limited to any specific configuration of each of the cooler 130A and the humidifier 140A. That is, as long as the cooler 130A and the humidifier 140A can be disposed in the internal space in the system frame 150A, the cooler 130A and the humidifier 140A may have any of various configurations.

Hereinafter, embodiments of the cooler 130A and the humidifier 140A will be described.

Figure 5A:
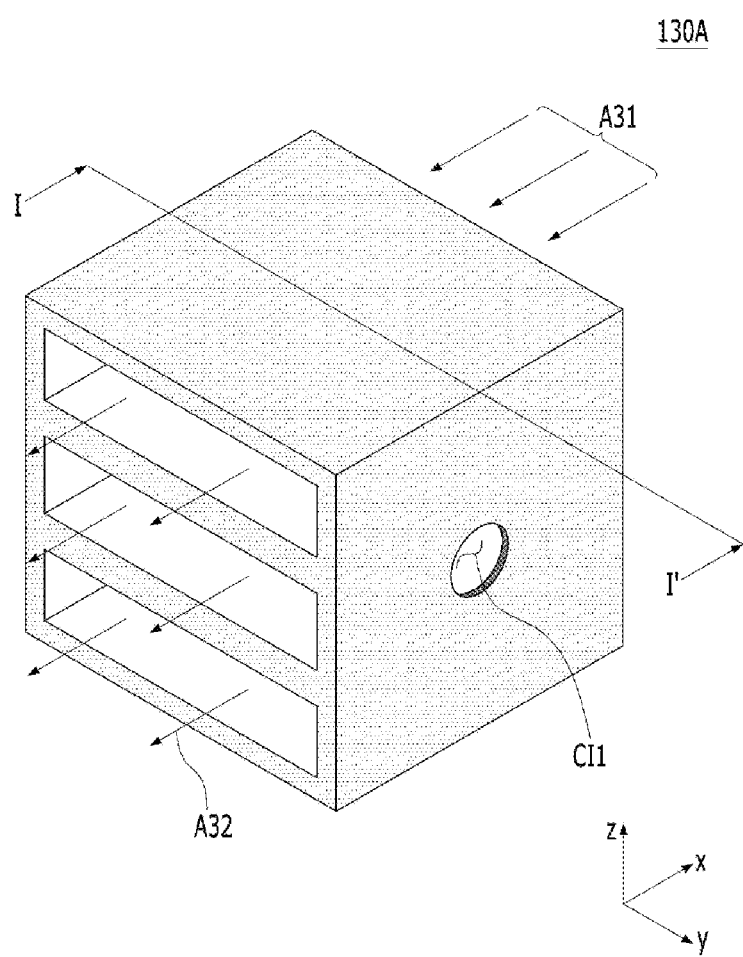
FIG. 5A is a perspective view of the cooler shown in FIG. 4.
Figure 5B:
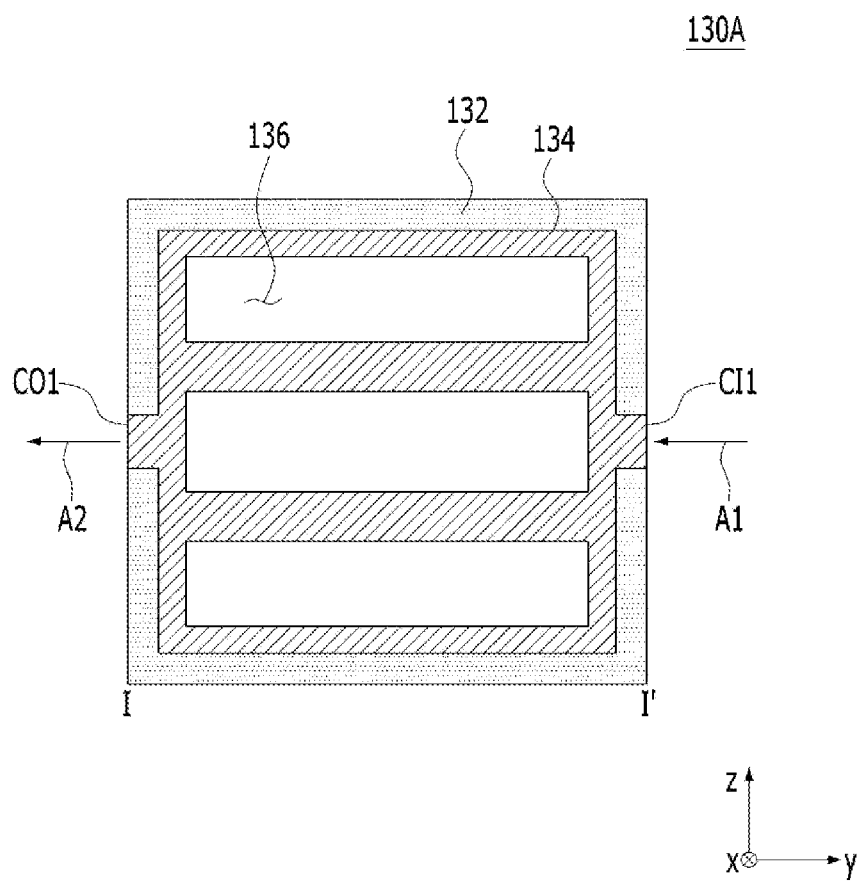
FIG. 5B is a cross-sectional view taken along line I-I' in FIG. 5A.

FIG. 5A is a perspective view of the cooler 130A shown in FIG. 4, and FIG. 5B is a cross-sectional view taken along line I-I' in FIG. 5A.

As illustrated in FIGS. 5A and 5B, the cooler 130A may be configured as a plate heat exchanger, but the embodiment is not limited to any specific configuration of the cooler 130A.

The cooler 130A may include a first cooling medium inlet CI1 and a first cooling medium outlet CO1. The first cooling medium inlet CI1 is an inlet into which a cooling medium (e.g. cooling water) is introduced. The cooling medium serves to cool the air that is discharged from the air compressor 120 and introduced from the third space S3 through the first air inlet AI1. The first cooling medium outlet CO1 is an outlet through which the cooling medium, having cooled the air, is discharged.

The cooler 130A may further include a body 132, a cooling pipe 134, and an air flow path 136. The cooling pipe 134 may be embedded in the body 132, and may be connected to the first cooling medium inlet CI1 and the first cooling medium outlet CO1.

In this case, the air flow path 136 is formed so as to be contiguous with the cooling pipe 134, and is located in a path through which the air introduced into the third space S3 flows to the humidifier 140A.

In the cooler 130A having the above-described configuration, the cooling medium introduced into the first cooling medium inlet CI1 in the direction of the arrow A1 passes through the cooling pipe 134 and is discharged through the first cooling medium outlet CO1 in the direction of the arrow A2. Hot air introduced into the air flow path 136 from the third space S3 in the direction of the arrow A31 is cooled by the cooling medium passing through the cooling pipe 134 while passing through the air flow path 136, and the cooled air is discharged in the direction of the arrow A32.

In order to supply the cooling medium to the cooler 130A from the outside and to discharge the cooling medium from the cooler 130A to the outside, the side plates of the system frame 150A may include a second cooling medium inlet CI2 and a second cooling medium outlet CO2.

The second cooling medium inlet CI2 is a hole into which the cooling medium is introduced from the outside, and may communicate with the first cooling medium inlet CI1. Accordingly, the cooling medium introduced from the outside may be supplied to the cooler 130A through the second cooling medium inlet CI2 and the first cooling medium inlet CI1.

For example, the second cooling medium inlet CI2 may be directly connected to the first cooling medium inlet CI1. In this case, as shown in FIG. 3A, the second cooling medium inlet CI2 may be formed in the first side plate SP1, among the side plates SP1 to SP4.

Alternatively, the second cooling medium inlet CI2 may be formed in the second side plate SP2, among the side plates SP1 to SP4. In this case, although not shown, the third space S3 shown in FIG. 3B may be divided into 3-1$^{st}$ and 3-2$^{nd}$ spaces, which are isolated from each other. The 3-1$^{st}$ space may communicate with the first air inlet AI1 to form a flow path for supplying the air discharged from the air compressor 120 to the cooler 130A, and the 3-2$^{nd}$ space may form a flow path for supplying the cooling medium, introduced from a second cooling medium inlet CI21 formed in the second side plate SP2, to the first cooling medium inlet CI1.

Hereinafter, the second cooling medium inlet CI2 will be described as being formed in the first side plate SP1, but the following description may also apply to a structure in which the second cooling medium inlet CI21 is formed in the second side plate SP2.

The second cooling medium outlet CO2 is a hole through which the cooling medium discharged from the first cooling medium outlet CO1 is discharged to the outside of the system frame 150A, and may communicate with the first cooling medium outlet CO1. Accordingly, the cooling medium discharged from the first cooling medium outlet CO1 of the cooler 130A may be discharged to the outside through the second cooling medium outlet CO2. For example, the second cooling medium outlet CO2 and the first cooling medium outlet CO1 may be directly connected to each other.

In addition, the side plate of the system frame 150A may further include a second air outlet AO2. The second air outlet AO2 is a hole through which air, which is a reactant gas discharged from the humidifier 140A, is discharged to the outside of the system frame 150A.

According to an embodiment, the fuel cell vehicle may further include an air pressure control (APC) unit 160. The APC unit 160 may be a valve and disposed in the second air outlet AO2 in order to control the pressure of the air discharged from the humidifier 140A to the outside of the system frame 150A.

Figure 6A:
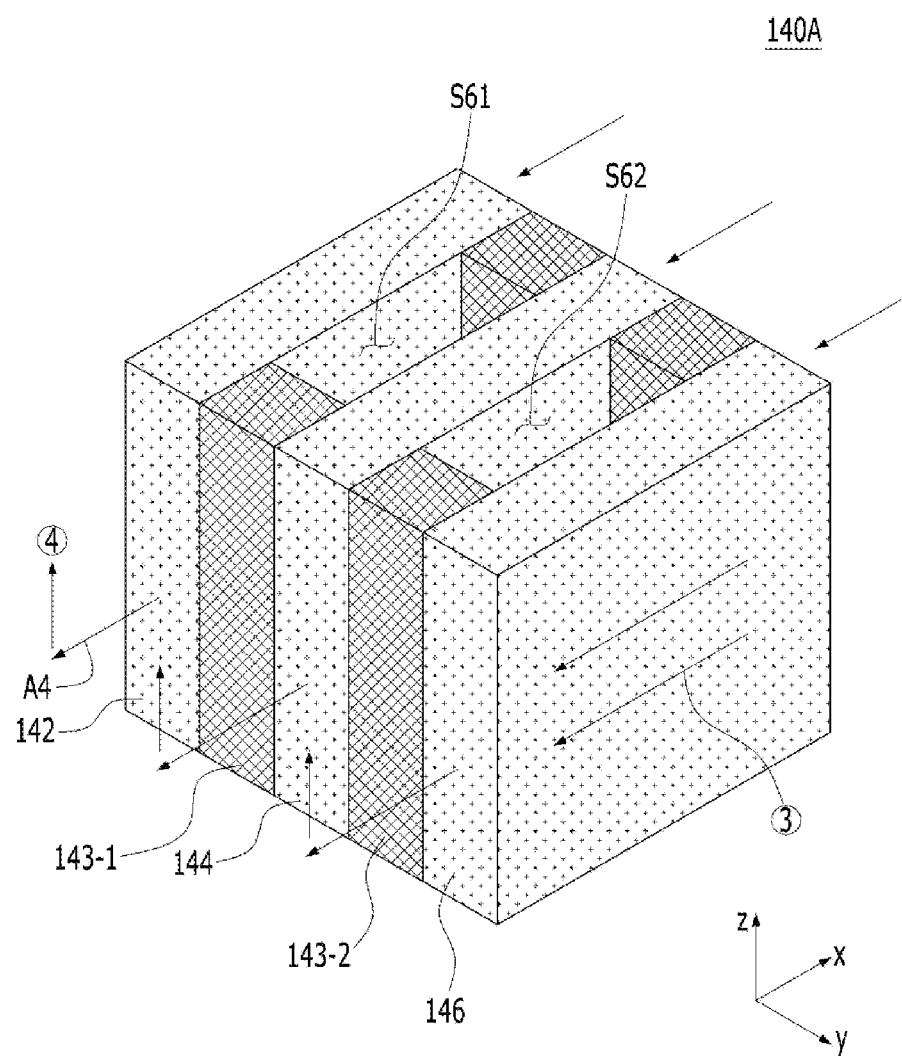
FIGS. 6A and 6B are, respectively, a perspective view and a front view of an embodiment of the humidifier shown in FIG. 4.
Figure 6B:
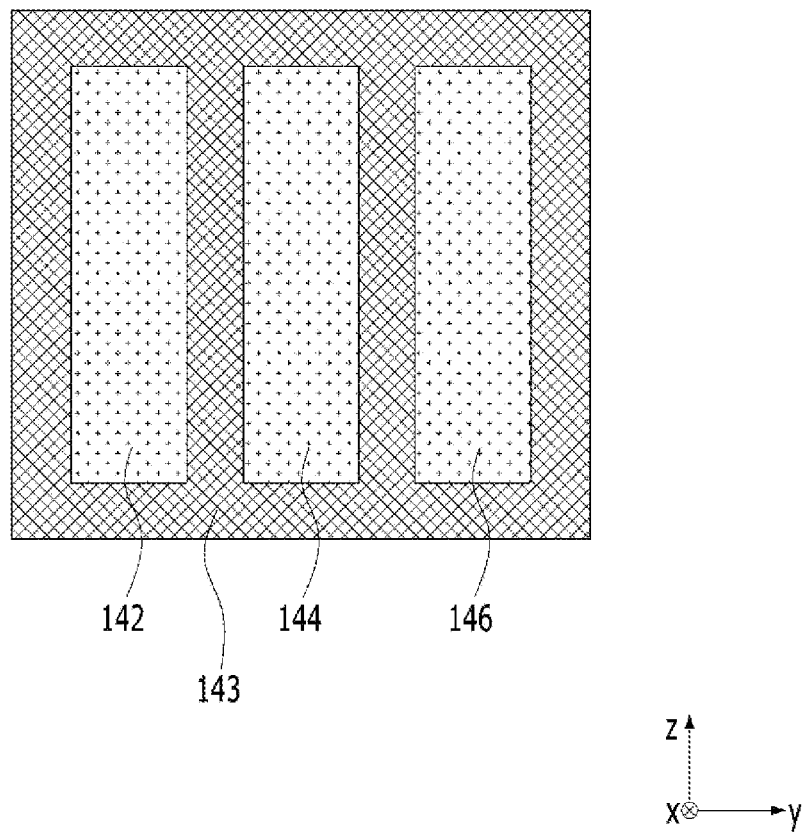

FIGS. 6A and 6B are, respectively, a perspective view and a front view of an embodiment of the humidifier 140A shown in FIG. 4.

Referring to FIGS. 6A and 6B, the humidifier 140A may include a plurality of hollow fiber membranes 142, 144 and 146 and partition walls 143 (143-1 and 143-2).

The hollow fiber membranes 142, 144 and 146 may be arranged so as to be spaced apart from each other in a direction (e.g. the second direction) that intersects the direction in which air flows from the cooler 130A toward the fuel cell 110. Each of the hollow fiber membranes 142, 144 and 146 is a kind of moisture-containing cartridge, which contains moisture and provides moisture to air that passes therethrough in the direction of the arrow A4.

The partition walls 143 (143-1 and 143-2) are disposed between the hollow fiber membranes 142, 144 and 146, and may form sixth spaces (e.g. shell sides) S61 and S62. For example, as shown in FIG. 6B, the partition walls 143 may be formed as a part of the system frame 150A. Alternatively, unlike what is shown in FIG. 6B, the partition walls 143 may be provided separately from the system frame 150A.

The shell sides S61 and S62 may communicate with the second air inlet AI2 and the condensate water inlet WI, and may be directly connected to the second air inlet AI2 and the condensate water inlet WI. This will be described later in detail with reference to FIGS. 8A and 8B.

Hereinafter, the process in which the air discharged from the air compressor 120 is supplied to the fuel cell 110 via the cooler 130A, the humidifier 140A, and the system frame 150A, which have the above-described configurations, and the process in which the reactant gases, the first condensate water, and the second condensate water, which are discharged from the fuel cell 110, are discharged to the outside via the system frame 150A and the humidifier 140A will be described with reference to the accompanying drawings.

Figure 7:
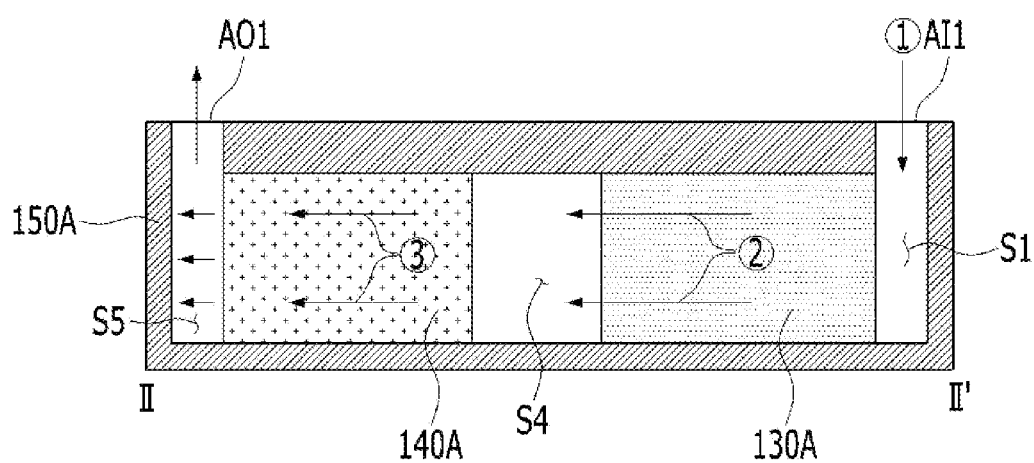
FIG. 7 is a view for explaining the process in which air discharged from an air compressor is supplied to a fuel cell via an air cutoff valve.

FIG. 7 is a view for explaining the process in which the air discharged from the air compressor 120 is supplied to the fuel cell 110 via the air cutoff valve 112.

FIG. 7 is a cross-sectional view taken along line II-II' in FIG. 3B in the state in which the cooler 130A and the humidifier 140A are disposed as shown in FIG. 4 in the internal space in the system frame 150A shown in FIG. 3B.

Referring to FIGS. 3A, 3B, 4 and 7, the air discharged from the air compressor 120 may be introduced into the third space S3 through the first air inlet AI1 in the direction of the arrow ①.

Thereafter, the air introduced into the third space S3 may pass through the cooler 130A in the direction of the arrow ②, and may be cooled by the cooler 130A. The process in which the air is cooled by the cooler 130A has been described above with reference to FIGS. 5A and 5B.

Thereafter, the air cooled by the cooler 130A may pass through the hollow fiber membranes 142, 144 and 146 of the humidifier 140A in the direction of the arrow ③, and may be humidified by the humidifier 140A.

Thereafter, the air humidified by the humidifier 140A may be discharged through the first air outlet AO1 in the direction of the arrow ④, and may be supplied to the fuel cell 110 through the inlet portion 112A of the air cutoff valve 112. Accordingly, the humidified air introduced into the inlet portion 112A of the air cutoff valve 112 may be supplied to the cell stack 111 of the fuel cell 110.

Figure 8A:
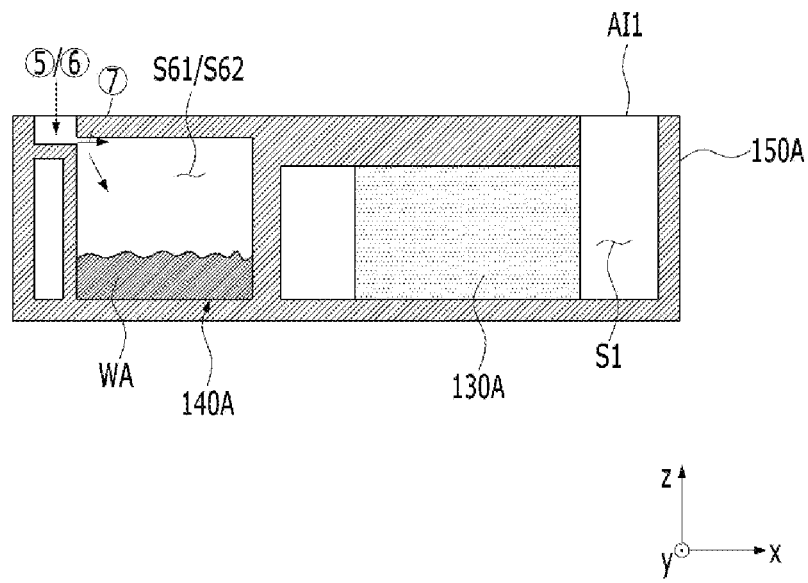
FIGS. 8A and 8B are views for explaining the process in which air containing moisture and first and second condensate water are supplied to the humidifier.
Figure 8B:
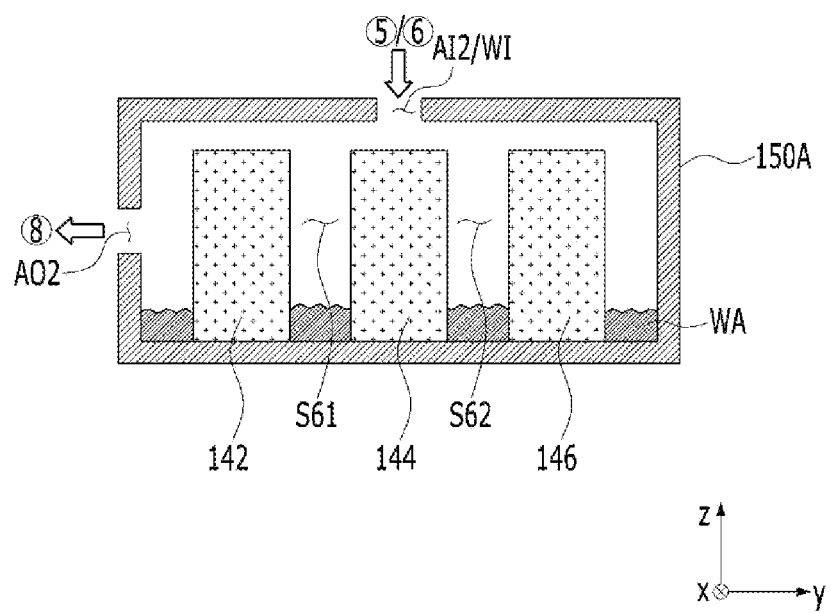

FIGS. 8A and 8B are views for explaining the process in which air containing moisture and the first and second condensate water WA are supplied to the humidifier 140A.

Referring to FIGS. 3A, 3B, 4, 8A and 8B, the air containing moisture, which is a reactant gas, and the first condensate water may be discharged through the outlet portion 112B of the air cutoff valve 112, and may then be introduced into the shell sides S61 and S62 of the humidifier 140A through the second air inlet AI2 in the direction of the arrow ⑤. In addition, the second condensate water discharged through the condensate water pipe 114 may also be introduced into the shell sides S61 and S62 of the humidifier 140A through the condensate water inlet WI in the direction of the arrow ⑥.

Thereafter, the air containing moisture and the first and second condensate water WA may be introduced into the shell sides S61 and S62 between the hollow fiber membranes 142, 144 and 146 in the direction of the arrow ⑦, thereby supplying moisture to the hollow fiber membranes 142, 144 and 146, i.e. humidifying the hollow fiber membranes 142, 144 and 146.

After supplying moisture to the hollow fiber membranes 142, 144 and 146, the air may be discharged to the outside of the system frame 150A through the second air outlet AO2 in the direction of the arrow ⑧.

Hereinafter, a process of manufacturing the system frame 150A in which the cooler 130A and the humidifier 140A are disposed will be described with reference to FIGS. 9A and 9B.

Figure 9A:
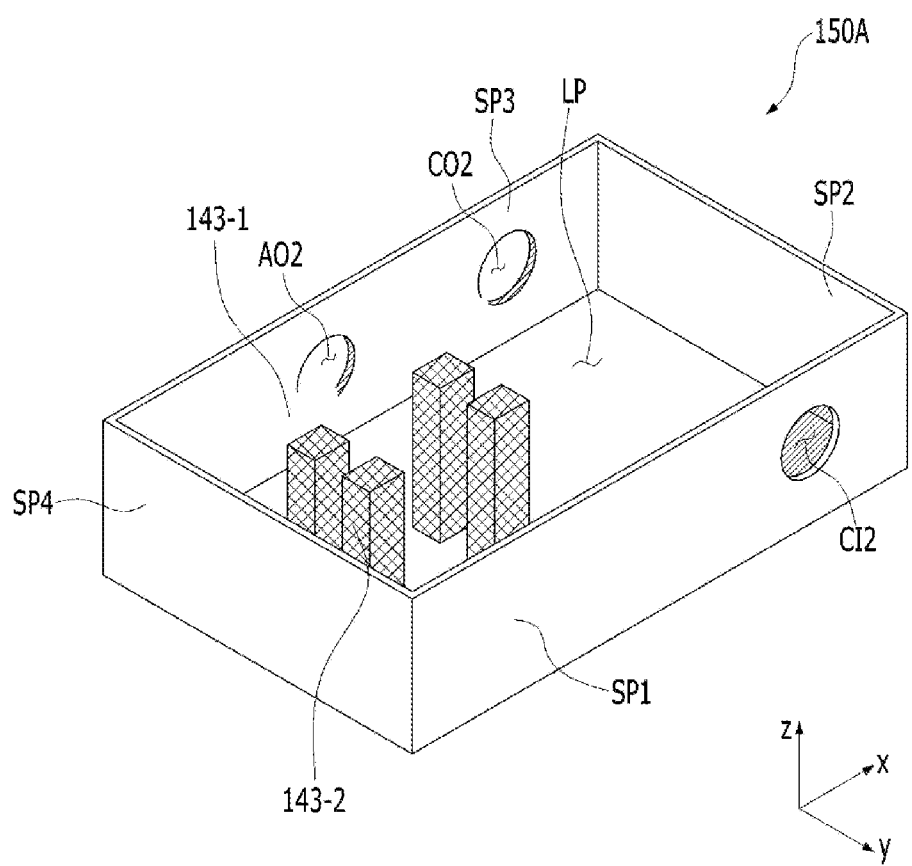
FIGS. 9A and 9B are perspective views showing a process of manufacturing the system frame in which the cooler and the humidifier are accommodated.
Figure 9B:
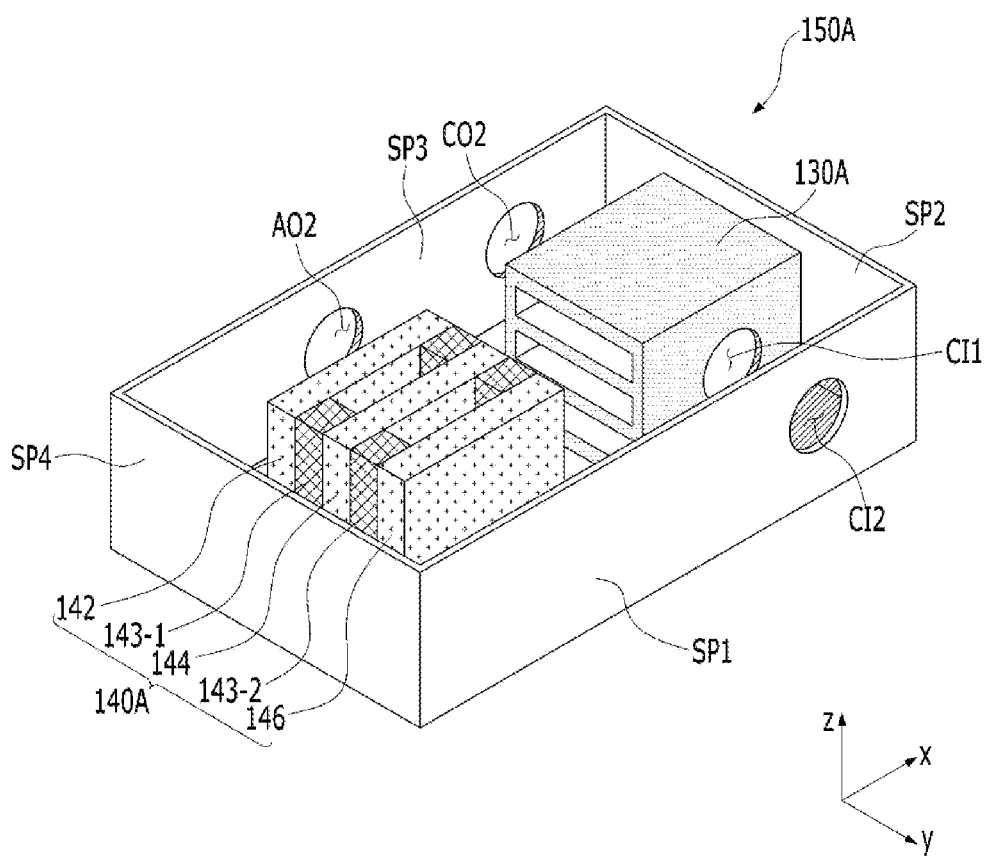

FIGS. 9A and 9B are perspective views showing a process of manufacturing the system frame 150A in which the cooler 130A and the humidifier 140A are accommodated.

Referring to FIG. 9A, the system frame 150A, in which the second cooling medium inlet CI2 is formed in the first side plate SP1 and the second cooling medium outlet CO2 and the second air outlet AO2 are formed in the third side plate SP3, is prepared.

Thereafter, the partition walls 143-1 and 143-2 are formed on the lower plate LP of the system frame 150A. As described above, the partition walls 143-1 and 143-2 may be integrally formed with the system frame 150A, or may be provided separately from the system frame 150A.

Thereafter, as shown in FIG. 9B, the cooler 130A is disposed in the first space S1, and the hollow fiber membranes 142, 144 and 146 are disposed between the partition walls 143-1 and 143-2, which are located in the second space S2.

Thereafter, the upper plate UP is placed on the result of processing shown in FIG. 9B to cover the same, thereby completely manufacturing the system frame 150A in the internal space of which the cooler 130A and the humidifier 140A are disposed, as shown in FIG. 3A.

Figure 10:
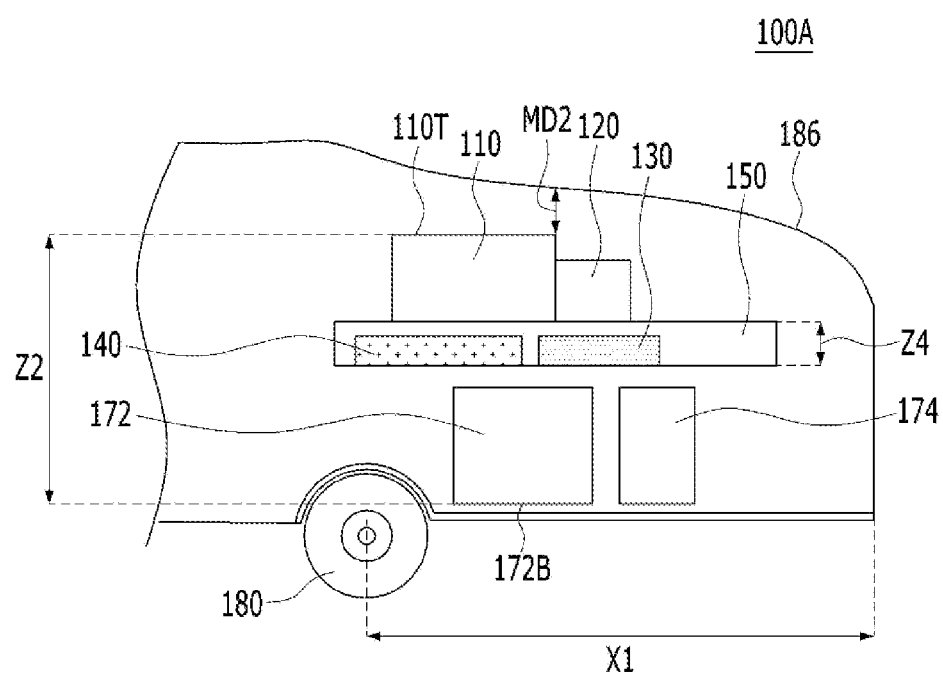
FIG. 10 is a side view of a fuel cell vehicle according to an embodiment.

FIG. 10 is a side view of a fuel cell vehicle 100A according to an embodiment.

The fuel cell vehicle 100A shown in FIG. 10 corresponds to an embodiment of the fuel cell vehicle 100 described above.

The fuel cell vehicle 100A shown in FIG. 10 may include a fuel cell 110, an air compressor 120, a cooler 130, a humidifier 140, a system frame 150, a driving motor 172, an inverter 174, front wheels 180, and a hood 186.

The fuel cell 110, the air compressor 120, the cooler 130, the humidifier 140, and the system frame 150 shown in FIG. 10 respectively correspond to the fuel cell 110, the air compressors 120, the cooler 130, the humidifier 140, and the system frame 150 shown in FIGS. 2A and 2B, and the front wheels 180 and the hood 186 shown in FIG. 10 respectively correspond to the front wheels 180 and the hood 186 shown in FIG. 1. Thus, the same components are denoted by the same reference numerals, and a duplicate description thereof will be omitted.

According to the embodiment, the driving motor 172 may be disposed under the system frame 150. The inverter 174 may be connected to the driving motor 172, and may be disposed under the system frame 150.

The inverter 174 may convert DC voltage of the cell stack 111 of the fuel cell 110 into AC voltage in accordance with the traveling state of the fuel cell vehicle 100A, and may supply the AC voltage to the driving motor 172. The driving motor 172 may be rotated by the AC voltage for the motor received from the inverter 174, thereby driving the fuel cell vehicle 100A. For example, the driving motor 172 may be a three-phase AC rotating device, which includes a rotor in which a permanent magnet is embedded, but the embodiment is not limited to any specific configuration of the driving motor 172.

Figure 11A:
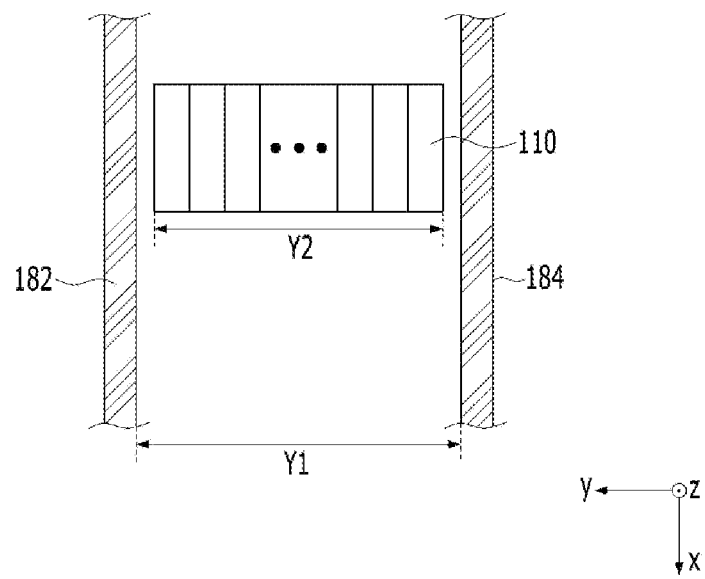
FIG. 11A is a plan view of a general lateral-mounting-type fuel cell vehicle.
Figure 11B:
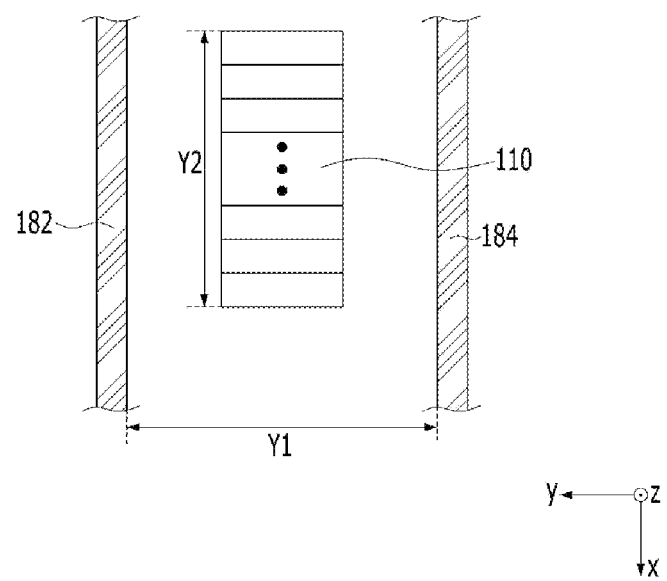
FIG. 11B is a plan view of a general longitudinal-mounting-type fuel cell vehicle.

FIG. 11A is a plan view of a general lateral-mounting-type fuel cell vehicle, and FIG. 11B is a plan view of a general longitudinal-mounting-type fuel cell vehicle.

Each of the fuel cell vehicles shown in FIGS. 11A and 11B includes first and second side members 182 and 184 and a fuel cell 110. Since the fuel cell 110 is the same as the fuel cell 110 shown in FIG. 10, it is denoted by the same reference numeral, and a duplicate description thereof will be omitted.

The first and second side members 182 and 184 may extend in the first direction (or forwards or backwards), which is the direction in which the fuel cell vehicle 100 (100A) travels (or moves), and may be arranged opposite each other so as to be spaced apart from each other in the second direction, which intersects the first direction.

The lateral-mounting-type fuel cell vehicle is a vehicle equipped with a cell stack 111, which includes a plurality of unit cells stacked on one another in a direction intersecting the direction in which the fuel cell vehicle travels (e.g. the first direction). When the spacing distance Y1 between the first and second side members 182 and 184 in the direction in which the first and second side members 182 and 184 face each other (e.g. the second direction) is greater than the length Y2 of the fuel cell 110 in the second direction, the fuel cell 110 may be disposed as shown in FIG. 11A.

However, when the spacing distance Y1 between the first and second side members 182 and 184 in the direction in which the first and second side members 182 and 184 face each other (e.g. the second direction) is less than the length Y2 of the fuel cell 110 in the second direction, the fuel cell 110 may be disposed as shown in FIG. 11B. That is, the longitudinal-mounting-type fuel cell vehicle is a vehicle equipped with a cell stack 111, which includes a plurality of unit cells stacked on one another in a direction parallel to the direction in which the fuel cell vehicle travels (e.g. the first direction).

Figure 12A:
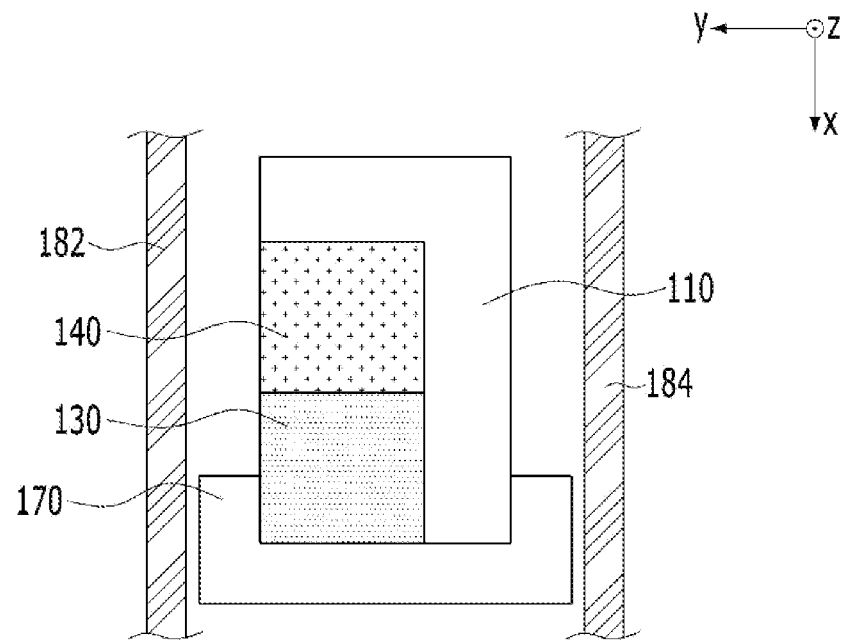
FIGS. 12A and 12B are, respectively, a plan view and a left side view of a fuel cell vehicle according to an embodiment.
Figure 12B:
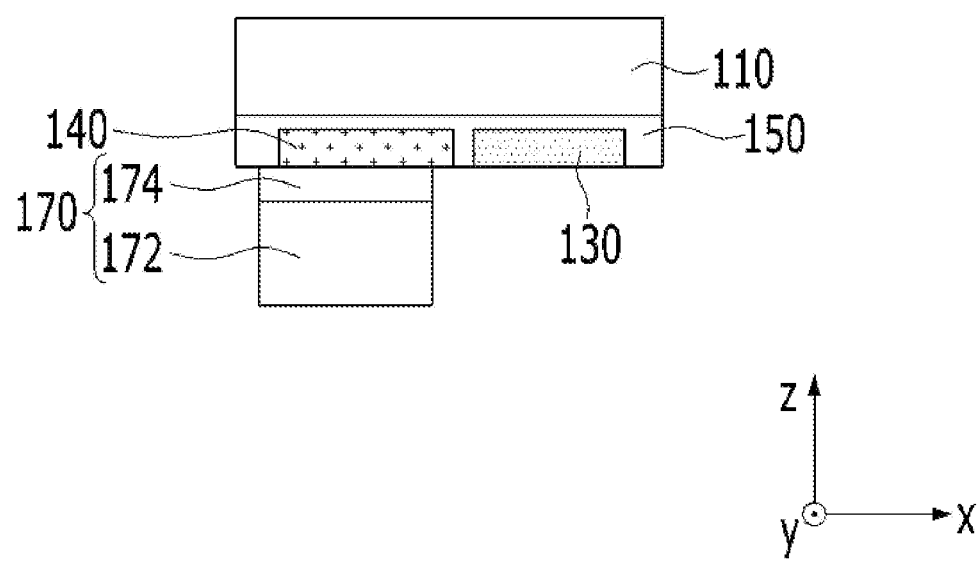

FIGS. 12A and 12B are, respectively, a plan view and a left side view of a fuel cell vehicle according to an embodiment.

In FIGS. 12A and 12B, the same components as those shown in FIGS. 10 and 11B are denoted by the same reference numerals, and a duplicate description thereof will be omitted. Further, the system frame 150 is not illustrated in FIG. 12A.

When the fuel cell vehicle according to the embodiment is the longitudinal-mounting-type fuel cell vehicle shown in FIG. 11B, the driving motor 172 and the inverter 174 may be disposed under the system frame 150, as shown in FIG. 12B.

According to an embodiment, as shown in FIG. 10, the inverter 174 may be disposed adjacent to the driving motor 172 in the direction in which the fuel cell vehicle travels (e.g. the first direction).

According to another embodiment, the inverter 174 may be disposed between the driving motor 172 and the system frame 150, as shown in FIG. 12B.

Figure 13A:
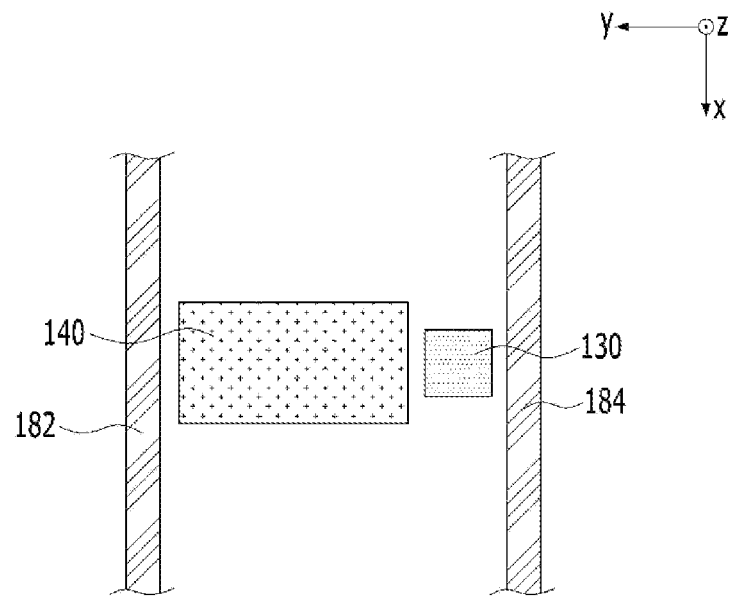
FIGS. 13A and 13B are, respectively, a plan view and a left side view of a fuel cell vehicle according to another embodiment.
Figure 13B:
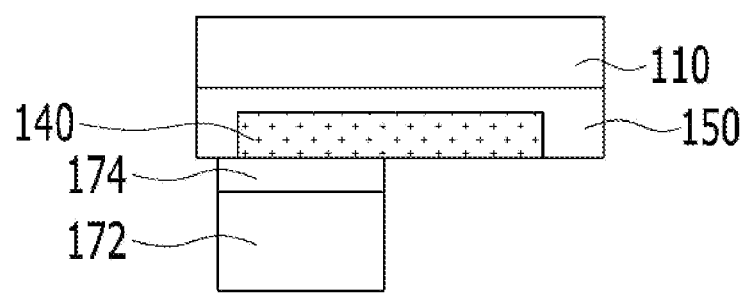
Figure 13B:
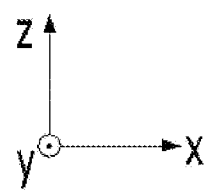

FIGS. 13A and 13B are, respectively, a plan view and a left side view of a fuel cell vehicle according to another embodiment.

In FIGS. 13A and 13B, the same components as those shown in FIGS. 10 and 11A are denoted by the same reference numerals, and a duplicate description thereof will be omitted. Further, the system frame 150, the driving motor 172, and the inverter 174 are not illustrated in FIG. 13A.

When the fuel cell vehicle according to the embodiment is the lateral-mounting-type fuel cell vehicle shown in FIG. 11A, the driving motor 172 and the inverter 174 may be disposed under the system frame 150, as shown in FIG. 13B.

According to an embodiment, as shown in FIG. 13B, the inverter 174 may be disposed between the driving motor 172 and the system frame 150.

According to another embodiment, as shown in FIG. 10, the inverter 174 may be disposed adjacent to the driving motor 172 in the direction in which the lateral-mounting-type fuel cell vehicle travels (e.g. the first direction).

Hereinafter, a fuel cell vehicle according to a comparative example and the fuel cell vehicle according to the embodiment will be described with reference to the accompanying drawings.

Figure 14A:
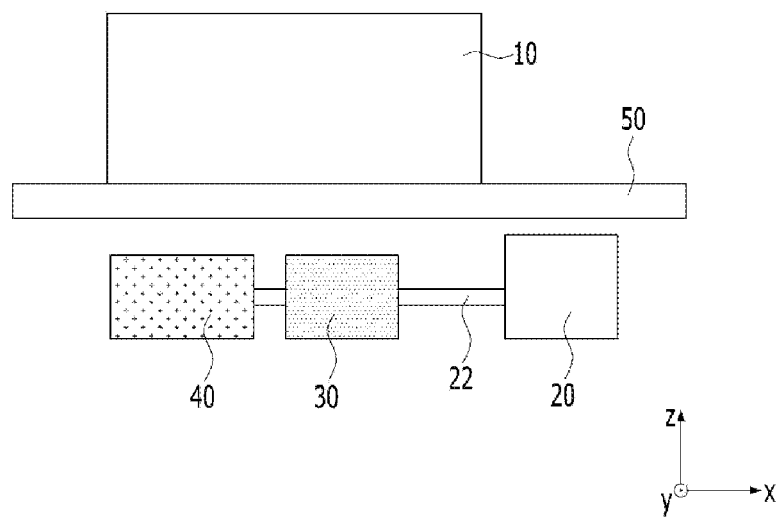
FIGS. 14A and 14B are, respectively, a side view and a rear view of a fuel cell vehicle according to a comparative example.
Figure 14B:
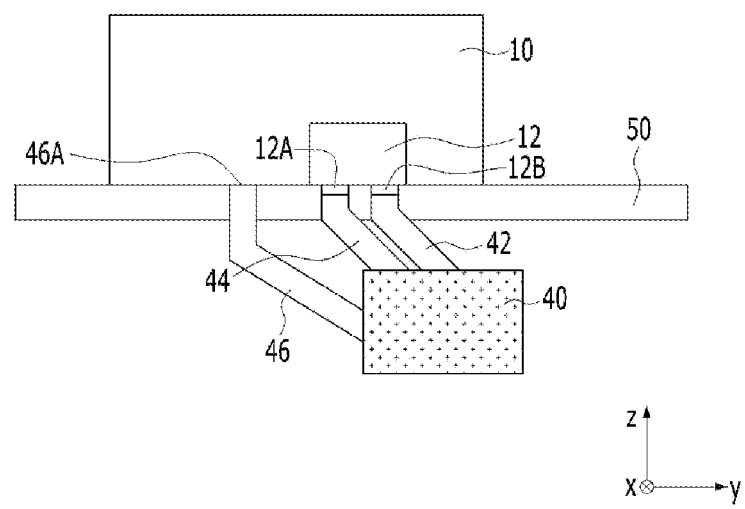

FIGS. 14A and 14B are, respectively, a side view and a rear view of a fuel cell vehicle according to a comparative example.

The fuel cell vehicle shown in FIGS. 14A and 14B may include a fuel cell 10, an air cutoff valve 12, an air compressor 20, a cooler 30, a humidifier 40, a system frame 50, and a plurality of pipes 22, 42, 44 and 46.

Since the fuel cell 10, the air cutoff valve 12, the air compressor 20, the cooler 30, the humidifier 40, and the system frame 50 shown in FIGS. 14A and 14B respectively perform the same functions as the fuel cell 110, the air cutoff valve 112, the air compressor 120, the cooler 130, the humidifier 140, and the system frame 150 shown in FIG. 10, a duplicate description thereof will be omitted.

Referring to FIG. 14A, the air discharged from the air compressor 20 may be supplied to the cooler 30 via the pipe 22. In contrast, in the case of the fuel cell vehicle according to the embodiment, the air discharged from the air compressor 120 may be directly introduced into the first air inlet AI1. Accordingly, the fuel cell vehicle according to the embodiment does not require the pipe 22 shown in FIG. 14A.

Further, as shown in FIG. 14B, the air humidified by the humidifier 40 may be supplied to the inlet portion 12A of the air cutoff valve 12 via the pipe 44, and the reactant gas and the first condensate water discharged from the fuel cell 10 through the outlet portion 12B of the air cutoff valve 12 may be supplied to the humidifier 40 via the pipe 42. In contrast, according to the embodiment, the inlet portion 112A of the air cutoff valve 112 may be directly connected to the first air outlet AO1, and the outlet portion 112B of the air cutoff valve 112 may be directly connected to the second air inlet AI2. Accordingly, the fuel cell vehicle according to the embodiment does not require the pipes 42 and 44 shown in FIG. 14B.

Further, the pipe 46 shown in FIG. 14B is a pipe through which hydrogen, which is a reactant gas, and the second condensate water discharged from the fuel cell 10 are supplied to the humidifier 40. The pipe 46 performs the same function as the condensate water pipe 114 shown in FIG. 2B. As shown in FIG. 14B, because the fuel cell 10 is spaced apart from the humidifier 40 with the system frame 50 interposed therebetween, the distance from the outlet 46A of the pipe 46 to the humidifier 40 is greater than the distance from the outlet 114A of the pipe 114 to the humidifier 140 shown in FIG. 2B. The reason for this is that, in the case of the embodiment, since the humidifier 140 is disposed inside the system frame 150, the spacing distance between the humidifier 140 and the fuel cell 110 is less than the spacing distance between the humidifier 40 and the fuel cell 10 in the comparative example. Accordingly, the length of the pipe 114 of the embodiment is shorter than the length of the pipe 46 of the comparative example.

As a result, unlike the fuel cell vehicle according to the comparative example, in which the pipes 22, 42 and 44 are requested and the length of the pipe 46 is relatively great, the fuel cell vehicle according to the embodiment is capable of reducing the cost of manufacturing the same and simplifying the process of manufacturing the same. In addition, in the case of the embodiment, since the air flow path between the air compressor 120 and the fuel cell 110 is relatively short, it is possible to reduce loss in the pressure of the air, thereby more reducing the amount of power consumed to operate the air compressor than that in the comparative example 120, thus increasing power efficiency compared to the comparative example.

Figure 15:
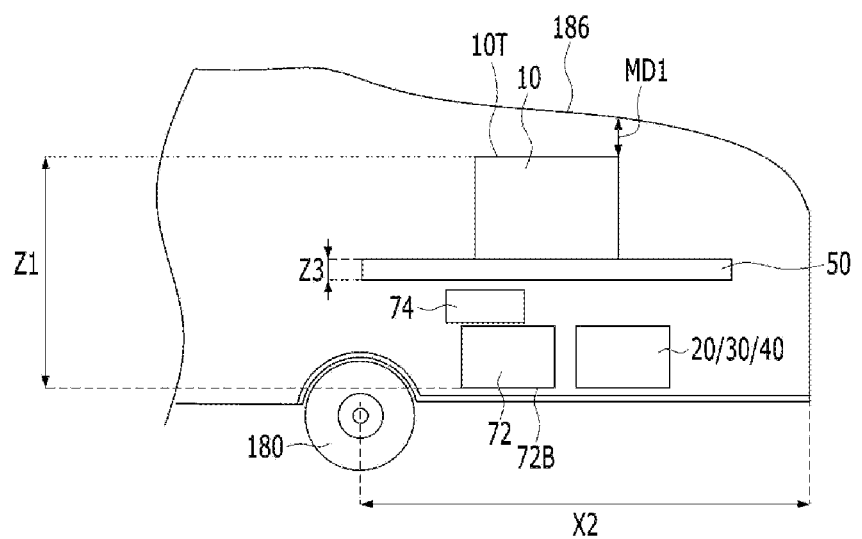
FIG. 15 is a side view of a fuel cell vehicle according to a comparative example.

FIG. 15 is a side view of a fuel cell vehicle according to a comparative example.

The fuel cell vehicle according to the comparative example shown in FIG. 15 may include a fuel cell 10, an air compressor 20, a cooler 30, a humidifier 40, a system frame 50, a driving motor 72, an inverter 74, front wheels 180, and a hood 186.

Since the fuel cell 10, the air compressor 20, the cooler 30, the humidifier 40, the driving motor 72, the inverter 74, the front wheels 180, and the hood 186 shown in FIG. 15 respectively perform the same functions as the fuel cell 110, the air compressor 120, the cooler 130, the humidifier 140, the driving motor 172, the inverter 174, the front wheels 180, and the hood 186 shown in FIG. 10, a duplicate description thereof will be omitted.

The air compressor 20, the cooler 30, and the humidifier 40 shown in FIG. 15 may be arranged as shown in FIGS. 14A and 14B.

In the case of the fuel cell vehicle according to the comparative example, the air compressor 20, the cooler 30, and the humidifier 40 are disposed under the system frame 50. In this case, the inverter 74 needs to be contiguous with the driving motor 72. However, because the air compressor 20, the cooler 30, and the humidifier 40 are disposed in front of the driving motor 72 in the region under the system frame 50, the inverter 74 is not capable of being located in front of the driving motor 72. Further, because a drive shaft is disposed behind the driving motor 72, rather than in front of the driving motor 72, the inverter 74 is not also capable of being located behind the driving motor 72. For this reason, in the case of the comparative example, the inverter 74 is inevitably disposed on the driving motor 72, which increases the height Z1 from the bottom surface 72B of the driving motor 72 to the top surface 10T of the fuel cell 10. The increase in the height Z1 may make it difficult to apply the structure shown in FIG. 15 to a passenger car, in which the profile of the hood 186 is relatively low. Further, the increase in the height Z1 may cause a reduction in the minimum distance MD1 from the top surface 10T of the fuel cell 10 to the hood 186.

In contrast, in the case of the fuel cell vehicle according to the embodiment, the cooler 130 and the humidifier 140 are disposed inside the system frame 150. Accordingly, as shown in FIG. 10, the inverter 174 may be disposed in the space ahead of the driving motor 172, which corresponds to the space ahead of the driving motor 72 in which the air compressor 20, the cooler 30, and the humidifier 40 are disposed in the fuel cell vehicle according to the comparative example shown in FIG. 15. Accordingly, the height Z2 from the bottom surface 172B of the driving motor 172 to the top surface 110T of the fuel cell 110 may be less than the height Z1 shown in FIG. 15. Accordingly, the fuel cell vehicle according to the embodiment is capable of being applied to a passenger car, in which the profile of the hood 186 is relatively low, e.g. a sedan. Further, the reduction in the height Z2 may cause an increase in the minimum distance MD2 from the top surface 110T of the fuel cell 110 to the hood 186. Accordingly, in the event of a collision between the vehicle and a pedestrian, the pedestrian may be more assuredly protected from the impact caused by the collision due to the increased minimum distance MD2 shown in FIG. 10, which is greater than the minimum distance MD1 shown in FIG. 15.

Further, as shown in FIGS. 12B and 13B, although the inverter 174 is disposed between the driving motor 172 and the system frame 150, the cooler 130 and the humidifier 140 are disposed in the internal space in the system frame 150, and thus the height Z2 from the bottom surface 172B of the driving motor 172 to the top surface 110T of the fuel cell 110 may be less than the height Z1 shown in FIG. 15.

As a result, compared to the fuel cell vehicle according to the comparative example, in the case of the fuel cell vehicle according to the embodiment, the space occupied by the cooler 130 and the humidifier 140 may be reduced, whereby the efficiency of use of space in the vehicle may be improved, and the power density per unit volume of the system (kW/L) may increase.

Further, in the case of the fuel cell vehicle according to the comparative example, because the air compressor 20, the cooler 30, and the humidifier 40 are disposed in front of the driving motor 72, the overhang X2 of the vehicle increases, as shown in FIG. 15. Here, the overhang is the distance from the central axis of the front wheels 180 to the foremost point of the vehicle. Thus, it is 30 or the humidifier 40. However, as shown in FIG. 17A, when the fuel cell example to a vehicle having a short overhang.

In contrast, in the case of the embodiment, the cooler 130 and the humidifier 140 are disposed inside the system frame 150, and the air compressor 120 is disposed on the system frame 150. Accordingly, the overhang X1 of the embodiment shown in FIG. 10 may be less than the overhang X2 of the comparative example shown in FIG. 15. Many automobile manufactures worldwide tend to manufacture vehicles having a short overhang in order to improve the aesthetics of vehicles and to sufficiently secure indoor space therein. Considering this, the fuel cell vehicle according to the embodiment may be effectively applied to a vehicle having a short overhang. Further, it is possible to dispose the driving motor 172 at a position close to the front side of the vehicle.

Figure 16A:
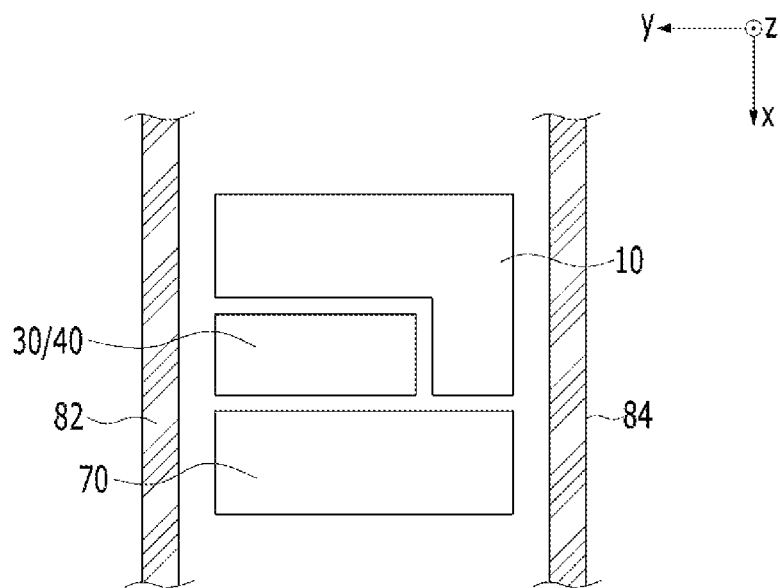
FIGS. 16A and 16B are, respectively, a plan view and a left side view of a lateral-mounting-type fuel cell vehicle according to a comparative example.
Figure 16B:
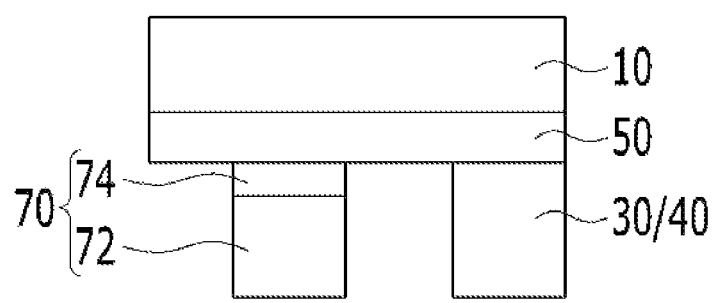
Figure 16B:
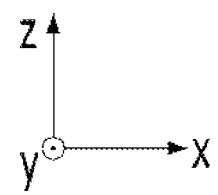

FIGS. 16A and 16B are, respectively, a plan view and a left side view of a lateral-mounting-type fuel cell vehicle according to a comparative example.

Figure 17A:
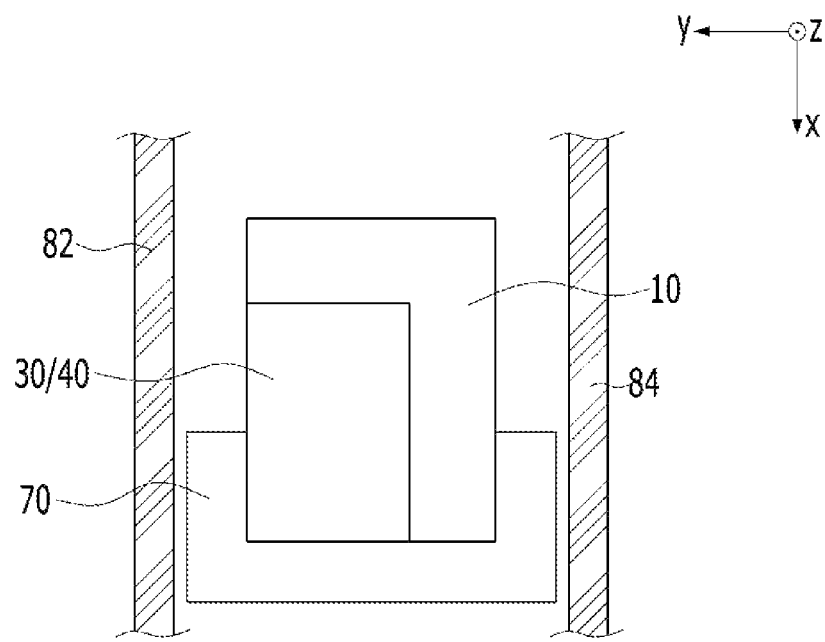
FIGS. 17A and 17B are, respectively, a plan view and a left side view of a longitudinal-mounting-type fuel cell vehicle according to a comparative example.
Figure 17B:
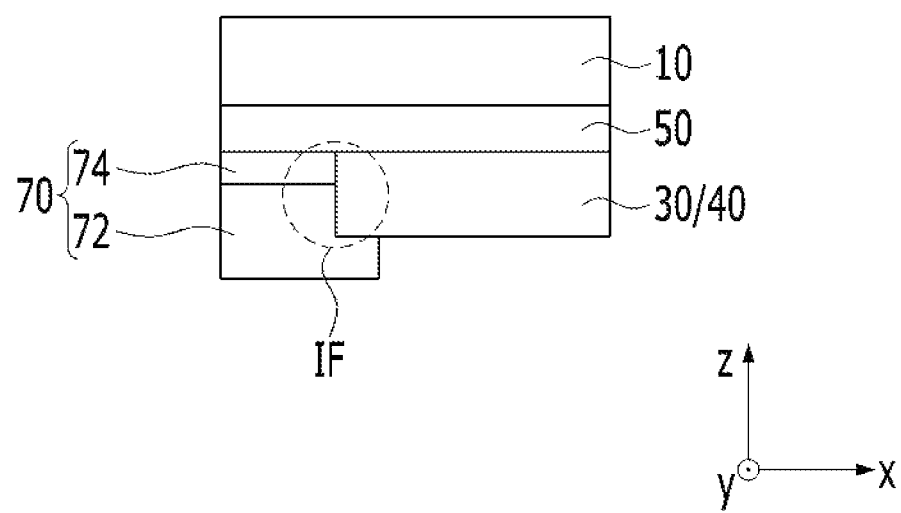

FIGS. 17A and 17B are, respectively, a plan view and a left side view of a longitudinal-mounting-type fuel cell vehicle according to a comparative example.

In FIGS. 16A, 16B, 17A and 17B, the same components as those shown in FIGS. 14A to 15 are denoted by the same reference numerals, and a duplicate description thereof will be omitted. First and second side members 82 and 84 respectively perform the same functions as the first and second side members 182 and 184 shown in FIGS. 12A, 12B, 13A and 13B.

In addition, in the comparative example, when the fuel cell 10 is mounted in the fuel cell vehicle, the system frame 50 is mounted on the first and second side members 82 and 84, and the cell stack 111 and other components are mounted on the system frame 50. To this end, the system frame 50 needs to have a certain amount of rigidity. However, when the thickness Z3 of the system frame 50 is reduced in order to reduce the height Z1 from the bottom surface 72B of the driving motor 72 to the top surface 10T of the fuel cell 10, the rigidity of the system frame 50 may be lowered. Therefore, there is a limitation on the extent to which it is possible to reduce the thickness Z3. Further, when the thickness Z3 is increased in order to increase the rigidity of the system frame 50, the height Z1 shown in FIG. 15 may be increased, and the minimum distance MD1 may be further reduced. Therefore, there is a limitation on the extent to which it is possible to increase the thickness Z3.

In contrast, in the case of the embodiment, since the cooler 130 and the humidifier 140 are disposed inside the system frame 150, the thickness Z4 of the system frame 150 becomes greater than the thickness Z3 of the system frame 50 of the comparative example, and thus the rigidity of the system frame 150 is greater than that of the system frame 50 of the comparative example. Further, when it is intended to increase the rigidity of the system frame 150, it is possible to further increase the thickness Z4 of the system frame 150 to a desired level. The reason for this is that the height Z2 from the bottom surface 172B of the driving motor 172 to the top surface 110T of the fuel cell 110 becomes reduced. That is, in the case of the embodiment, since the thickness Z4 of the system frame 150, which accommodates the cooler 130 and the humidifier 140 therein, is greater than the thickness Z3, the rigidity of the system frame 150 may be increased, the robustness of the fuel cell vehicle may be increased, and the height Z2 may become less than the height Z1 of the comparative example.

As shown in FIG. 16A, when the fuel cell vehicle of the comparative example is a lateral-mounting-type vehicle, the driving motor 72 and the inverter 74 may be disposed so as not to interfere with the cooler 30 or the humidifier 40. However, as shown in FIG. 17A, when the fuel cell vehicle of the comparative example is a longitudinal-mounting-type vehicle, the arrangement of the driving motor 72 and the inverter 74 may interfere with the arrangement of the cooler 30 and/or the humidifier 40 (refer to the dotted-line circle IF in FIG. 17B).

In contrast, as shown in FIG. 12B, in the case of the longitudinal-mounting-type fuel cell vehicle according to the embodiment, since the cooler 130 and the humidifier 140 are disposed inside the system frame 150, the interference shown in FIG. 17B (refer to the dotted-line circle IF) does not occur.

As is apparent from the above description, according to the fuel cell vehicle of the embodiment, the cost of manufacturing the same may be reduced, and the process of manufacturing the same may be simplified. In addition, since loss in the pressure of air is reduced, it is possible to reduce the amount of power consumed to operate the air compressor, thus increasing power efficiency. In addition, the efficiency of use of space in the vehicle may be improved, and thus the power density per unit volume of the system may increase. In addition, the fuel cell vehicle according to the embodiment may be effectively applied to a vehicle having a short overhang, and may have increased robustness. In particular, when the fuel cell vehicle according to the embodiment is a longitudinal-mounting-type vehicle, the arrangement of the cooler and the humidifier does not interfere with the arrangement of the driving motor.

However, the effects achievable through the disclosure are not limited to the above-mentioned effects, and other effects not mentioned herein will be clearly understood by those skilled in the art from the above description.

The above-described various embodiments may be combined with each other without departing from the scope of the present disclosure unless they are incompatible with each other.

In addition, for any element or process that is not described in detail in any of the various embodiments, reference may be made to the description of an element or a process having the same reference numeral in another embodiment, unless otherwise specified.

While the present disclosure has been particularly shown and described with reference to exemplary embodiments thereof, these embodiments are only proposed for illustrative purposes, and do not restrict the present disclosure, and it will be apparent to those skilled in the art that various changes in form and detail may be made without departing from the essential characteristics of the embodiments set forth herein. For example, respective configurations set forth in the embodiments may be modified and applied. Further, differences in such modifications and applications should be construed as falling within the scope of the present disclosure as defined by the appended claims.

What is claimed is:

1. A fuel cell vehicle, comprising:
   a fuel cell;
   an air compressor configured to draw in and discharge air;
   a cooler configured to cool air discharged from the air compressor;
   a humidifier configured to humidify air cooled by the cooler and to supply the humidified air to the fuel cell; and
   a system frame on which the fuel cell is disposed, the system frame accommodating at least a portion of each of the cooler and the humidifier therein.

2. The fuel cell vehicle according to claim 1, wherein the air compressor is disposed on the system frame.

3. The fuel cell vehicle according to claim 2, further comprising:
   a driving motor disposed under the system frame; and an inverter connected to the driving motor, the inverter being disposed under the system frame.

4. The fuel cell vehicle according to claim 3, wherein the inverter is disposed adjacent to the driving motor in a direction in which the fuel cell vehicle travels.

5. The fuel cell vehicle according to claim 4, wherein the fuel cell comprises a cell stack configured to generate power using hydrogen and air, the cell stack comprising a plurality of unit cells stacked on one another, and
wherein the plurality of unit cells is stacked in a direction parallel to a direction in which the fuel cell vehicle travels.

6. The fuel cell vehicle according to claim 3, wherein the inverter is disposed between the driving motor and the system frame.

7. The fuel cell vehicle according to claim 1, wherein the system frame comprises:
an upper plate;
a lower plate disposed under the upper plate; and
a plurality of side plates disposed between the upper plate and the lower plate and configuring an internal space in which the cooler and the humidifier are disposed, and
wherein the air compressor is disposed on the upper plate.

8. The fuel cell vehicle according to claim 7, wherein the internal space comprises:
a first space in which the cooler is disposed;
a second space in which the humidifier is disposed, the second space being adjacent to the first space in a first direction, in which the fuel cell vehicle travels; and
a third space communicating with the first space to form a flow path through which air discharged from the air compressor travels to the cooler.

9. The fuel cell vehicle according to claim 8, wherein the upper plate comprises:
a first air inlet into which air discharged from the air compressor is introduced, the first air inlet communicating with the third space;
a first air outlet through which air discharged from the humidifier is discharged to the fuel cell;
a second air inlet into which air and condensate water discharged from the fuel cell are introduced, the air being a reactant gas; and
a condensate water inlet into which condensate water together with hydrogen discharged from the fuel cell is introduced, the hydrogen being a reactant gas.

10. The fuel cell vehicle according to claim 9, wherein the internal space further comprises a fifth space as a flow path through which air discharged from the humidifier travels to the first air outlet.

11. The fuel cell vehicle according to claim 10, wherein the humidifier comprises:
a plurality of hollow fiber membranes spaced apart from each other; and
partition walls disposed between the plurality of hollow fiber membranes as shell sides communicating with the second air inlet and the condensate water inlet.

12. The fuel cell vehicle according to claim 9, wherein the air compressor is directly connected to the first air inlet.

13. The fuel cell vehicle according to claim 9, further comprising an air cutoff valve configured to receive the air discharged from the humidifier and to discharge the condensate water and air as the reactant gas.

14. The fuel cell vehicle according to claim 13, wherein the air cutoff valve is directly connected to the first air outlet and the second air inlet.

15. The fuel cell vehicle according to claim 8, wherein the cooler comprises:
a first cooling medium inlet into which a cooling medium is introduced to cool air introduced from the third space; and
a first cooling medium outlet through which the cooling medium, having cooled air, is discharged.

16. The fuel cell vehicle according to claim 15, wherein the plurality of side plates as collectively comprises:
a second cooling medium inlet into which the cooling medium is introduced from an outside, the second cooling medium inlet communicating with the first cooling medium inlet;
a second cooling medium outlet through which the cooling medium discharged from the first cooling medium outlet is discharged to the outside; and
a second air outlet communicating with the second space to discharge air discharged from the humidifier to the outside therethrough, the air being a reactant gas.

17. The fuel cell vehicle according to claim 16, further comprising an air pressure control unit disposed in the second air outlet.

18. The fuel cell vehicle according to claim 8, wherein the internal space further comprises a fourth space between the first space and the second space as a flow path through which air discharged from the cooler travels to the humidifier.

* * * * *